(12) United States Patent
Inoue et al.

(10) Patent No.: US 9,096,198 B2
(45) Date of Patent: Aug. 4, 2015

(54) ROAD SLOPE DETECTING APPARATUS AND METHOD FOR VEHICLE

(75) Inventors: Gen Inoue, Susono (JP); Yasuhito Ishida, Kariya (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 2429 days.

(21) Appl. No.: 11/802,058

(22) Filed: May 18, 2007

(65) Prior Publication Data
US 2007/0276576 A1 Nov. 29, 2007

(30) Foreign Application Priority Data
May 23, 2006 (JP) ................................. 2006-143209

(51) Int. Cl.
*B60T 7/12* (2006.01)
*B60T 8/172* (2006.01)
*F16H 59/66* (2006.01)

(52) U.S. Cl.
CPC ................. *B60T 7/122* (2013.01); *B60T 8/172* (2013.01); *F16H 59/66* (2013.01); *B60T 2201/06* (2013.01)

(58) Field of Classification Search
CPC ..................... B60G 17/0165; B60W 30/18118; F02D 3300/702; G01B 21/30; B60Q 2300/324; G01C 1/00; G01C 9/00
USPC ...................................................... 701/80, 96
See application file for complete search history.

(56) References Cited

U.S. PATENT DOCUMENTS

| 4,041,283 | A | * | 8/1977 | Mosier ............................. 701/20 |
| 4,651,290 | A | * | 3/1987 | Masaki et al. .................. 701/80 |
| 4,735,273 | A | | 4/1988 | Naito |
| 4,741,207 | A | * | 5/1988 | Spangler .......................... 73/146 |
| 4,748,564 | A | | 5/1988 | Matsuda |
| 4,814,991 | A | | 3/1989 | Tada et al. |
| 4,823,902 | A | | 4/1989 | Onishi et al. |

(Continued)

FOREIGN PATENT DOCUMENTS

DE  44 21 565 A1  12/1995
DE  199 33 087 A1  1/2001

(Continued)

OTHER PUBLICATIONS

Evaluation of adaptive cruise control algorithms on a virtual test track; Donghoon Han; Kyongsu Yi; American Control Conference, 2006; Digital Object Identifier: 10.1109/ACC.2006.1657658.

(Continued)

*Primary Examiner* — John Q Nguyen
*Assistant Examiner* — Kyung Kim
(74) *Attorney, Agent, or Firm* — Oliff PLC

(57) ABSTRACT

A road slope determining apparatus for a vehicle includes a slope measuring device that measures a slope of a road on which the vehicle is traveling; a distance measuring device that measures a distance traveled by the vehicle; and a determining apparatus that determines, based on the measured slope and the measured distance traveled, whether the vehicle is traveling on a gradient in which the slope is continuous or on a rough road in which the slope is discontinuous. This road slope determining apparatus is able to appropriately determine whether the road has a slope when the vehicle is traveling at slow speeds such as when running off-road, for example.

14 Claims, 7 Drawing Sheets

(56) References Cited

U.S. PATENT DOCUMENTS

| | | | |
|---|---|---|---|
| 5,003,482 A | 3/1991 | Teratani et al. | |
| 5,177,683 A | 1/1993 | Oo et al. | |
| 5,187,977 A * | 2/1993 | Koschorek et al. | 73/146 |
| 5,260,876 A | 11/1993 | Oo et al. | |
| 5,278,764 A | 1/1994 | Iizuka et al. | |
| 5,329,455 A | 7/1994 | Oo et al. | |
| 5,404,302 A | 4/1995 | Matsuda et al. | |
| 5,617,086 A * | 4/1997 | Klashinsky et al. | 340/907 |
| 5,646,850 A | 7/1997 | Ishida et al. | |
| 5,731,911 A | 3/1998 | Kagoshima | |
| 5,731,977 A | 3/1998 | Taniguchi et al. | |
| 5,980,000 A | 11/1999 | Kolbe et al. | |
| 6,104,976 A | 8/2000 | Nakamura | |
| 6,116,618 A * | 9/2000 | Shono et al. | 280/5.501 |
| 6,122,587 A | 9/2000 | Takahara et al. | |
| 6,135,089 A * | 10/2000 | Shibagaki | 123/436 |
| 6,346,064 B1 | 2/2002 | Hada et al. | |
| 6,494,282 B1 | 12/2002 | Hessmert et al. | |
| 6,679,807 B2 | 1/2004 | Kato et al. | |
| 7,319,927 B1 | 1/2008 | Sun et al. | |
| 7,416,037 B2 | 8/2008 | Huelser et al. | |
| 2002/0107106 A1 | 8/2002 | Kato et al. | |
| 2002/0156557 A1 | 10/2002 | Gras | |
| 2003/0060961 A1 | 3/2003 | Ishizu et al. | |
| 2003/0236606 A1 | 12/2003 | Lu et al. | |
| 2004/0015279 A1 | 1/2004 | Barron et al. | |
| 2004/0093145 A1 | 5/2004 | Tanimichi et al. | |
| 2004/0129470 A1 | 7/2004 | Huelser et al. | |
| 2004/0138802 A1 | 7/2004 | Kuragaki et al. | |
| 2005/0085974 A1 | 4/2005 | Hedman et al. | |
| 2005/0124459 A1 | 6/2005 | Ito | |
| 2007/0114084 A1 | 5/2007 | Huelser et al. | |
| 2009/0150075 A1 | 6/2009 | Watanabe et al. | |

FOREIGN PATENT DOCUMENTS

| | | |
|---|---|---|
| DE | 100 06 780 C1 | 9/2001 |
| FR | 2 813 050 A1 | 2/2002 |
| JP | A-01-153344 | 6/1989 |
| JP | A-03-150039 | 6/1991 |
| JP | B2-06-021641 | 3/1994 |
| JP | A-06-249009 | 9/1994 |
| JP | A-08-133043 | 5/1996 |
| JP | A-08-200111 | 8/1996 |
| JP | A-09-020161 | 1/1997 |
| JP | A-11-078597 | 3/1999 |
| JP | A2003-092803 | 3/2003 |
| JP | A-2004-090679 | 3/2004 |
| JP | A-2004-332639 | 11/2004 |
| JP | 2006315607 A * | 11/2006 |
| KR | 9006594 B | 9/1990 |
| WO | WO 03/051663 | 6/2003 |

OTHER PUBLICATIONS

Automatic cruise control modeling—a lattice PWL approximation approach; Junaid, K.M.; Shuning Want; Intelligent Transportation Systems Conference, 2006. ITSC '06 IEEE; Digital Object Identifier: 10.1109/ITSC.2006 1707414.

Intelligent cruise control stop and go with and without communication; Acarman, T. Yiting Liu; Ozguner, U.; American Control Conference, 2006; Digital Object Identifier: 10/1109/ACC.2006. 1657404.

Evaluation of Integrated ACC (Adaptive Cruise Control)/CA (Collision Avoidance) on a Virtual Test Track; Donghoon Han; Kyongsu Yi; Seungjong Yi; SICE-ICASE, 2006. International Joint Conference; Digital Object Identifier: 10.1109/SICE.2006.315564; Publication Year: 2006, pp. 2127-2132.

Office Action cited in U.S. Appl. No. 11/645,640, dated Apr. 9, 2010.

U.S. Appl. No. 11/645,640, filed Dec. 27, 2006 in the name of Gen Inoue et al.

Donghoon Han, et al, "Evaluation of Adaptive Cruise Control Algorithms on a Virtual Test Track," 2006 American Control Conference, Minneapolis, MN, Jun. 14-16, 2006; pp. 5849-5854.

Khan M. Junaid, et al., "Automatic Cruis Control Modeling—A Lattice PWL Approximation Approach," 2006 IEEE Intelligent Transportation Systems Conference, Toronto, Canada; Sep. 16-20, 2006; pp. 1370-1375.

Tankut Acarman, et al.; "Intelligent Cruise Control Stop and Go with and without Communication," 2006 American Control Conference, Minneapolis, MN; Jun. 14-16; pp. 4356-4361.

Dongltoon Han et al., "Evaluation of Integrated ACC (Adaptive Cruise Control)/CA (Collision Avoidance) on a Virtual Test Track," SICE-ICASE International Joint Conference 2006, Busan, Korea; Oct. 18-21, 2006.

Office Action in related U.S. Appl. No. 11/645,640, dated Apr. 9, 2010.

Apr. 16, 2013 Notice of Allowance issued in U.S. Appl. No. 12/223,579.

* cited by examiner

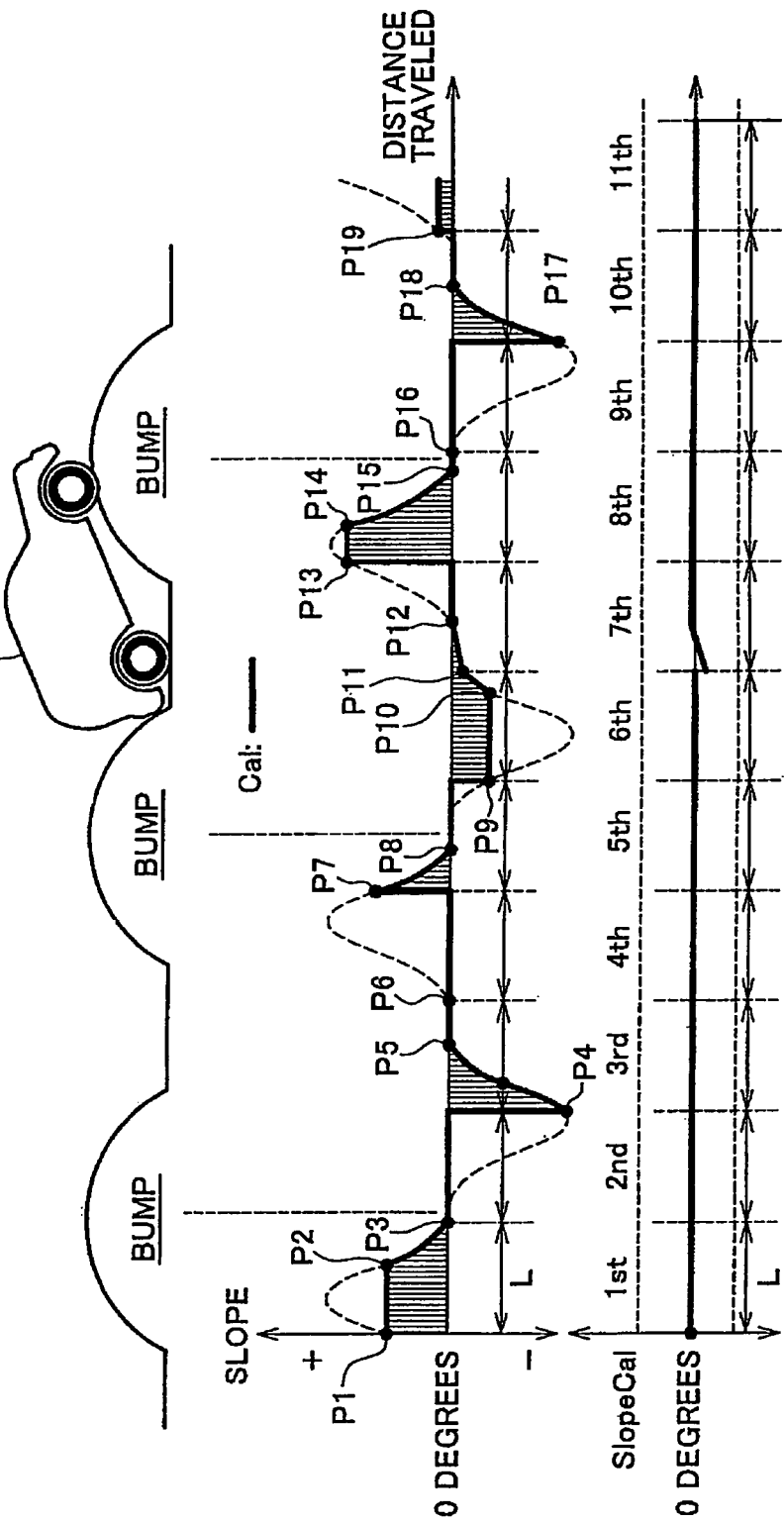

ROAD SLOPE DETECTING APPARATUS AND METHOD FOR VEHICLE

INCORPORATION BY REFERENCE

The disclosure of Japanese Patent Application No. 2006-143209 filed on May 23, 2006, including the specification, drawings and abstract is incorporated herein by reference in its entirety.

BACKGROUND OF THE INVENTION

1. Field of the Invention

The invention relates to a road slope determining apparatus and method for a vehicle, which determines the slope of a road on which the vehicle is traveling.

2. Description of the Related Art

Technology is known which measures the slope of a road surface when a vehicle is traveling on a gradient, for example. Japanese Patent Publication No. 6-21641, for example, describes a control apparatus of a vehicle which, as a method for measuring the slope of a road, measures an average value of a slope measured in units of time, or more specifically, within a certain period of time, as the slope of the road.

However, in the method of measuring the slope of a road in Japanese Patent Publication No. 6-21641 described above, the slope is measured in units of time. Therefore, when the vehicle is traveling at slow or extremely slow speeds, for example, it is technically difficult to differentiate between a gradient and a rough road that is regarded as being on generally level ground, for example.

SUMMARY OF THE INVENTION

This invention thus provides a road slope determining apparatus capable of appropriately determining whether a road has a slope when a vehicle is traveling at slow speeds such as when running off-road, for example.

One aspect of the invention relates to a road slope determining apparatus for a vehicle, which includes a slope measuring device that measures a slope of a road on which the vehicle is traveling a distance measuring device that measures a distance traveled by the vehicle; and a determining apparatus that determines, based on the measured slope and the measured distance traveled, one of i) whether the vehicle is traveling on a gradient in which the slope is continuous and ii) whether the vehicle is traveling on a rough road in which the slope is discontinuous.

With the road slope determining apparatus according to this aspect, the determination as to whether the vehicle is traveling on a gradient or on level ground is made based on i) the distance traveled by the vehicle, and ii) the slope corresponding to that distance traveled. Here, the phrase "having a continuous slope" means, for example, that a value of the slope either tends to increase and then become substantially constant over a relatively long distance of travel, or tends to decrease and then become substantially constant over a relatively long distance of travel. On the other hand, the phrase "having a discontinuous slope" according to this aspect not only means having no or almost no slope, but also includes the concept of having a discrete or discontinuous positive or negative slope within a relatively short distance.

As a result, it is possible to appropriately and accurately determine whether the vehicle is traveling on a gradient or on level ground based on a correlative transition between the distance traveled which does not rely on time, and the slope.

Another aspect of the invention relates to a road slope determining method for a vehicle, which includes measuring a slope of a road on which the vehicle is traveling; measuring a distance traveled by the vehicle; and determining, based on the measured slope and the measured distance traveled, one of i) whether the vehicle is traveling on a road on a gradient in which the slope is continuous and ii) whether the vehicle is traveling on a rough road in which the slope is discontinuous.

The road slope determining method for a vehicle according to this aspect makes it possible to appropriately and accurately determine whether the vehicle is traveling on a gradient or on level ground based on a correlative transition between the distance traveled which does not rely on time, and the slope.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 is a view of a frame format schematically illustrating a determining method when a vehicle is traveling on a rough road that is regarded as being on level ground according to the example embodiment;

DETAILED DESCRIPTION OF THE PREFERRED EMBODIMENTS

In the following description and the accompanying drawings, the present invention will be described in more detail in terms of exemplary embodiments.

Figure 1:
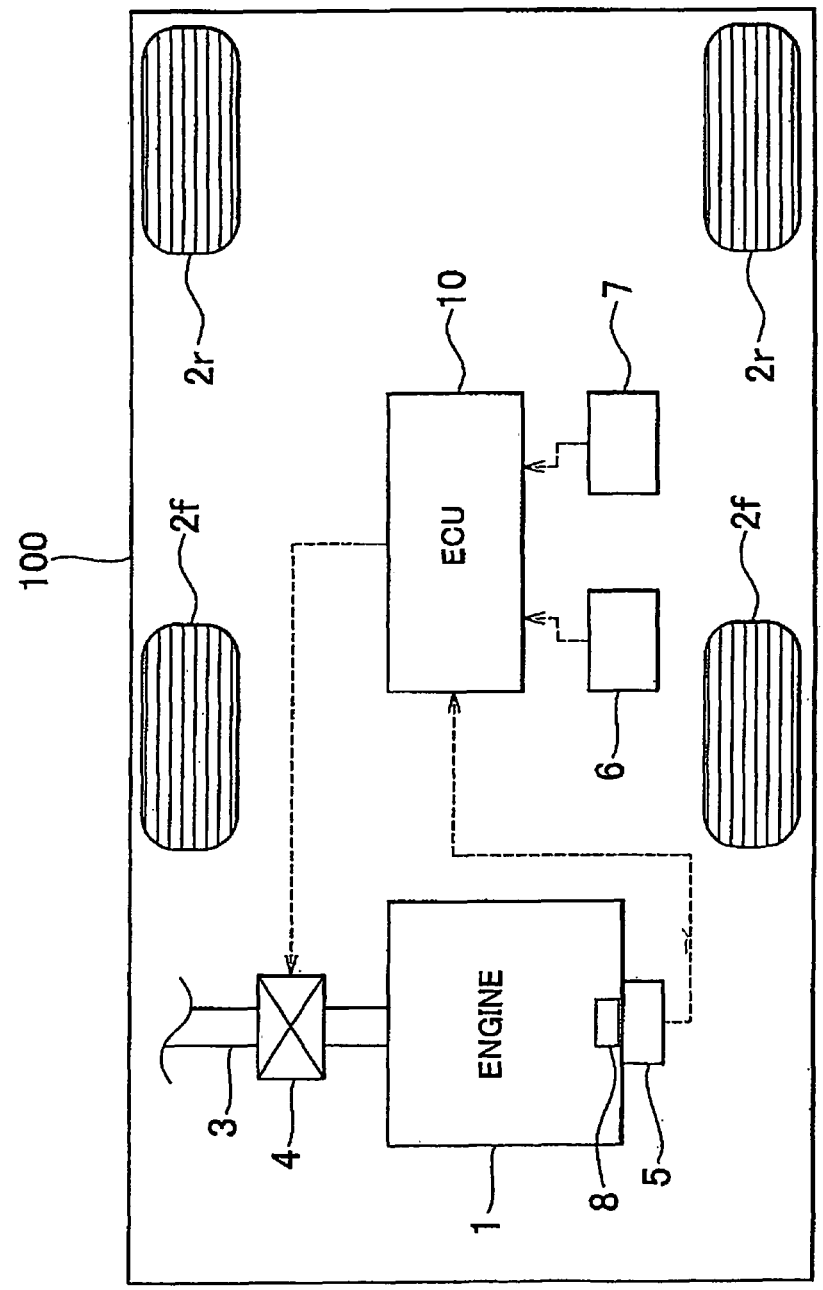
FIG. 1 is a block diagram schematically showing the structure of a vehicle according to one example embodiment of the invention.

(1) Basic Structure of Vehicle:

First, the general structure of a vehicle to which a control apparatus for a vehicle according to one example embodiment of the invention has been applied will be described with reference to FIG. 1. FIG. 1 is a block diagram schematically showing the structure of a vehicle 100 according to this example embodiment. In the drawing, the vehicle 100 is viewed from above, with the left side being the front of the vehicle 100 and the right side being the rear of the vehicle 100. Also, the broken arrows in the drawing show signal inputs and outputs.

The vehicle 100 mainly includes an engine (i.e., an internal combustion engine) 1, front wheels 2f, rear wheels 2r, a throttle valve 4, a torque sensor 5, a vehicle speed sensor (i.e., a specific example of distance measuring device according to the invention) 6, an acceleration sensor (i.e., a specific example of slope measuring device according to the invention) 7, an engine speed sensor 8 that measures the engine speed, and an ECU (Engine Control Unit) 10 (i.e., a specific example of determining apparatus according to the invention). The vehicle according to this example embodiment may also be provided with a brake system and brake devices that operate in coordination with various systems to stabilize the vehicle, such as ABS (Antilock Braking System) and VSC (Vehicle Stability Control).

The engine 1 is an internal combustion engine that generates power by burning an air-fuel mixture inside a combustion chamber. The power generated by the engine 1 is transmitted to at least either the front wheels $2f$ or the rear wheels $2r$ via a torque converter, a transmission and a drive shaft and the like, none of which are shown.

Also, air is supplied to the engine 1 via an intake passage 3. The throttle valve 4 is arranged in this intake passage 3 and serves to adjust the amount of air supplied to the engine 1. The throttle valve 4 is controlled by the ECU 10.

The torque sensor 5 detects drive torque output by the engine 1 and the vehicle speed sensor 6 detects the speed of the vehicle 100 (i.e., the vehicle speed). Also, the acceleration sensor 7 detects both acceleration of the vehicle 100 as well as the slope (inclination) of a gradient of the road on which the vehicle is currently traveling. These detected values are output to the ECU 10 as detection signals. This acceleration sensor 7 may also be formed by a gravity sensor or a slope sensor.

The ECU 10 includes a CPU, ROM, RAM, an A/D converter, and an input/output interface and the like. The ECU 10 executes a determining routine as well as various control routines based on the detection signals supplied by the various sensors described above. In this example embodiment, the ECU 10 may execute the determining routine, to be described later, of the vehicle 100 based on the detection signals, and execute a control routine to control the drive torque applied to the vehicle 100 based on the results of that determining routine.

(2) Method for Determining Gradient or Level Ground:

Next, a method for determining whether the vehicle is traveling on a gradient or on level ground according to this example embodiment will be described with reference to FIGS. 2 to 6.

Figure 2:
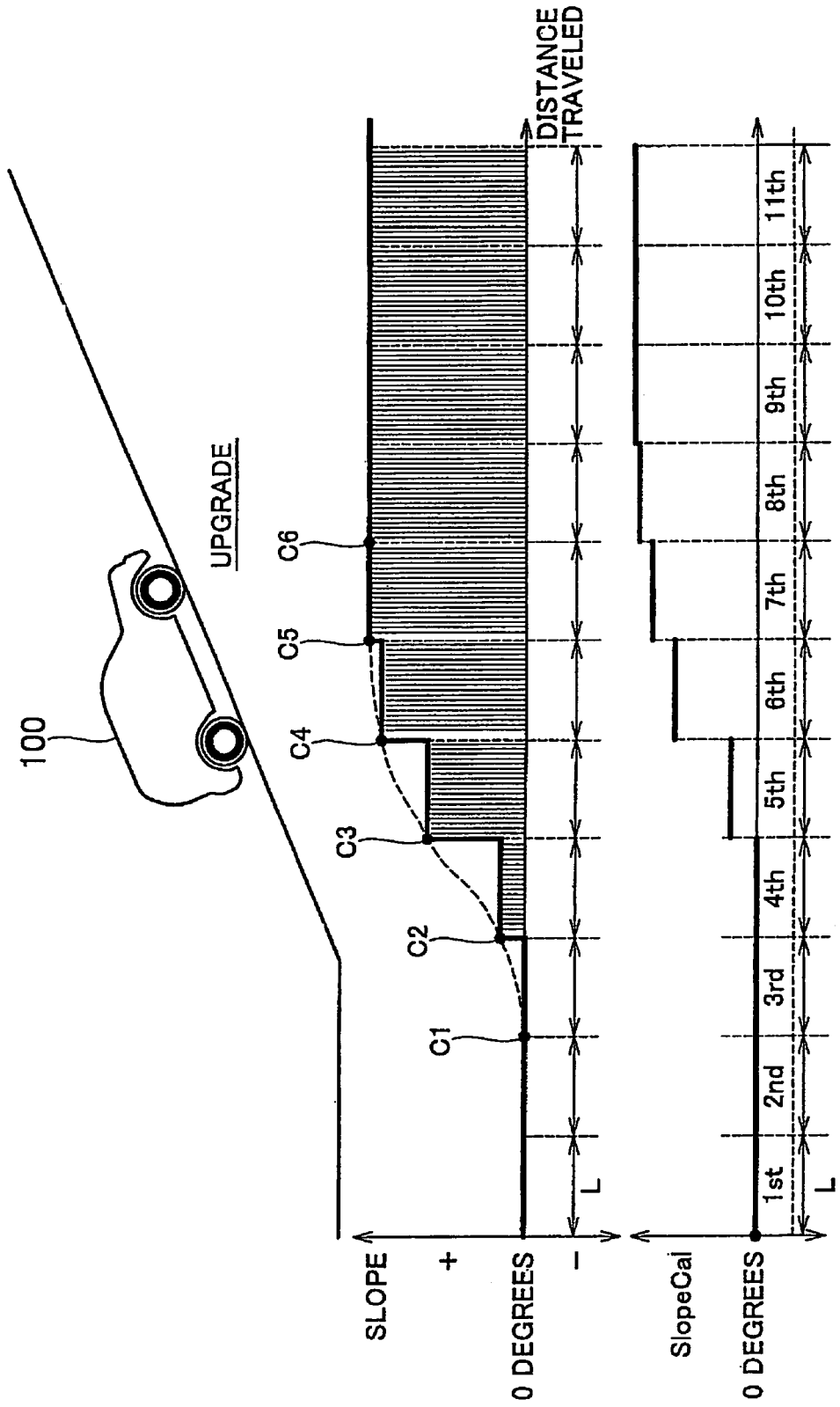
FIG. 2 is a view of a frame format schematically illustrating a determining method when a vehicle is traveling on a road on a gradient according to the example embodiment.

(2-1) Basic Concept of Method for Determining Gradient or Level Ground:

First, the basic concept of the method for determining whether the vehicle is traveling on a gradient or on level ground according to this example embodiment will be described with reference to FIGS. 2 and 3. FIG. 2 is a view of a frame format schematically illustrating a determining method when a vehicle is traveling on a road on a gradient according to the example embodiment. FIG. 3 is a view of a frame format schematically illustrating a determining method when a vehicle is traveling on a rough road that is regarded as being on level ground according to the example embodiment.

The vertical axis of the graphs in FIGS. 2 and 3 represents the slope and the horizontal axis represents the distance that the vehicle has traveled. Also, the solid lines in the graphs in FIGS. 2 and 3 represent a change in a representative value of the slope measured in units of a predetermined distance L, to be described later. Here, this representative value refers to a representative value that is characteristic of one or a plurality of slope values measured in the predetermined distance L to be described later. Examples of this representative value may include a calculated value or an initial slope (the term "end slope" refers to the slope at either the beginning slope or the end slope of the predetermined distance L), to be described later. The dotted lines in the graphs in FIGS. 2 and 3 represent the value of the slope measured by the acceleration sensor (in this example embodiment, the value of the slope measured by the acceleration sensor will be appropriately referred to as "actually measured value"). Also, the upper portion in FIG. 2 shows the vehicle 100 traveling on a gradient (an upgrade) and the upper portion in FIG. 3 shows the vehicle 100 traveling on a rough road.

The solid line in the lower portion of the graphs represents a change in the value of the slope determined in the predetermined distance L of the last leg (i.e., a change in a variable SlopeCal, to be described later).

(2-1-1) A Case of a Road on a Gradient:

In the determining method according to this example embodiment, as shown in the lower portion of FIG. 2, a determination as to whether the vehicle is traveling on a gradient is made based on i) the distance the vehicle has traveled, which is measured in units of a predetermined distance L, ii) an end slope measured at the beginning of each predetermined distance L (i.e., one representative value determined in units of one predetermined distance L), for example, and iii) the end slope of the predetermined distance L of the last leg (i.e., another representative value determined in units of another predetermined distance L), for example. Here, the term "gradient" in this example embodiment means a road having a continuous slope. Further, the phrase "having a continuous slope" means, for example, that a value of the slope tends to increase and then become substantially constant over a relatively long distance of travel (compared with a relatively short distance of travel in the definition of level ground, which will be described later). In this case, the definition refers to a gradient (an upgrade). Alternatively, the phrase "having a continuous slope" means that the value of the slope tends to decrease and then become substantially constant over a relatively long distance of travel, for example. In this case, the definition refers to a gradient (a downgrade).

Also, the phrase "predetermined distance" in this example embodiment refers to a specified distance traveled by the vehicle in order to determine whether the vehicle is traveling on a gradient or on a road on level ground. This predetermined distance may also be theoretically, experimentally, or empirically specified or specified based on simulation or the like, based on tire diameter of the wheels (the front wheels $2f$ and the rear wheels $2r$), the vehicle weight, the gear ratio of the transmission, and map information specified by the slope. More specifically, a minimum value of the predetermined distance may be specified based on the distance between a first position where the front wheels of the vehicle contact the road surface and a second position where the rear wheels of the vehicle contact the road surface (i.e., the so-called length of the wheel base). Accordingly, it is possible to more quickly and accurately determine whether the vehicle is traveling on a gradient or on a road on level ground. Alternatively, a maximum value of the predetermined distance may be specified based on the overall length of the vehicle. Accordingly, when the vehicle is traveling at slow or extremely slow speeds, it is possible to more appropriately and accurately determine whether the vehicle is traveling on a gradient or on a road on level ground without that determination being affected much or at all by any sudden changes in the slope.

Specific examples of this "representative value" other than the end slope of the predetermined distance L of the last leg (which corresponds to the variable SlopeCal) may include an average value of the slope in the predetermined distance L of the last leg and a calculated value of the predetermined value L of the last leg. The determination as to whether the vehicle is traveling on a gradient or a rough road regarded as being on level ground can be made based on a change in one such representative value or in another representative value.

In particular, in this example embodiment, as shown in the upper portion of FIG. 2, when the vehicle 100 is traveling on an upward gradient, i.e., an upgrade, for example, the measured slope of the road first gradually increases as the vehicle starts to climb the gradient (see from the 1st predetermined distance L to the 5th predetermined distance L, for example, in the lower portion of the graph in FIG. 2). Next, the measured slope of the road converges on a substantially constant value as the vehicle continues to climb the gradient (see from the 6th predetermined distance L to the 9th predetermined distance L, for example).

Further, in this example embodiment, the slope measured at the beginning of the predetermined distance L, for example, corresponds to a distance traveled by the vehicle. More specifically, first the slope at beginning point C1 of the 3rd predetermined distance is measured. Next, the slope at beginning point C2 of the 4th predetermined distance is measured. Then the slope at beginning point C3 of the 5th predetermined distance is measured. Thereafter, in a substantially similar manner, the slope at beginning point C4 of the 6th predetermined distance is measured, the slope at beginning point C5 of the 7th predetermined distance is measured, and the slope at beginning point C6 of the 8th predetermined distance is measured.

In particular, with the method for determining whether the vehicle is traveling on a gradient or on level ground according to this example embodiment, the determination as to whether the vehicle is traveling on level ground may be made based on i) the distance the vehicle has traveled, which is measured in units of predetermined distance L, ii) an end slope measured at the beginning of each predetermined distance L (i.e., one representative value determined in units of one predetermined distance L), for example, and iii) the end slope of the predetermined distance L of the last leg (i.e., another representative value determined in units of another predetermined distance L), for example, as shown in the lower portion of FIG. 3. Incidentally, the end slope measured at the beginning of each predetermined distance L corresponds to a variable Cal which will be described later. Also, the end slope determined (used) at the predetermined distance L of the last leg corresponds to a variable SlopeCal which will also be described later.

More specifically, the determination as to whether the vehicle is traveling on a gradient or on level ground may also be made based on the value of the slope measured at the beginning point C3 of the 5th predetermined distance described above, for example, and the value of the slope measured at the 4th predetermined distance, for example, as indicated by the variable SlopeCal, which will be described later, in the lower portion of the graph in FIG. 2.

Accordingly, it is possible to more appropriately and accurately determine whether the vehicle is traveling on a gradient or on a rough road that is regarded as being on level ground based on the correlative transition between the distance traveled which does not rely on time and the representative value determined in units of the predetermined distance L.

(2-1-2) Case of a Rough Road Regarded as being on Level Ground

As shown in the lower portion of FIG. 3, with the determining method according to this example embodiment, the determination as to whether the vehicle is traveling on level ground is made based on i) the distance traveled by the vehicle, which is measured in units of the predetermined distance L, and ii) the slope measured in that predetermined distance L. Here, the term "level ground" in this example embodiment means a road that does not have a continuous slope. Further, not having a continuous slope not only means having no or almost no slope, but also includes the concept of having a discrete or discontinuous positive or negative slope within a relatively short distance. More specifically, it refers to a broad meaning of the term level ground that includes a rough road on which there are obstacles or obstructions, for example.

Generally, as shown in the upper portion of the graph in FIG. 3, when the vehicle 100 is traveling on a rough road, for example, the measured slope of the road first sharply increases in a positive direction as the vehicle starts to climb a rise or bump in the rough road and then sharply decreases (see the dotted lines in the 1st predetermined distance J, for example, in the lower portion of the graph in FIG. 3). Next, when the vehicle crests the bump in the rough road, the measured slope of the road converges on substantially 0 (see the front half in the 2nd predetermined distance L, for example).

On the other hand, as the vehicle continues and descends off of the bump in the rough road, the measured slope of the road sharply increases in the negative direction and then sharply decreases (see the dotted line in the 2nd predetermined distance L and the solid line in the 3rd predetermined distance L, for example, in the lower portion of the graph in FIG. 3). Next, when the vehicle is in contact with a dip or valley in the rough road, the measured slope of the road converges on-substantially 0 (see the latter half of the 3rd predetermined distance L, fox example).

More specifically, according to the determining method of this example embodiment, the determination as to whether the vehicle is traveling on a gradient or on level ground is made based on i) the distance traveled by the vehicle, which is measured in units of the predetermined distance L, and ii) the slope measured in units of that predetermined distance L. Accordingly, it is possible to more appropriately and accurately determine whether the vehicle is traveling on a road on a gradient or on a road on level ground based on the correlative transition between the distance traveled which does not rely on time, and the slope.

In addition, according to the determining method of this example embodiment, iii) a representative value determined in units of the predetermined distance L which is, for example, an end slope measured at the beginning of the predetermined distance L for example, or a calculated value that includes at least one of the minimum value, maximum value, average value, integral value, or derivative value of the slope measured in the predetermined distance L on which the vehicle is currently traveling, for example, corresponds to the distance traveled. Further, iv) that representative value determined in units of that predetermined distance L and the actual measured slope that was measured in that predetermined distance L are compared. The determination as to whether the vehicle is traveling on a gradient or on a rough road regarded as being on level ground is then made based on the slope having the smaller absolute value. Accordingly, when the vehicle is traveling at slow or extremely slow speeds, it is possible to more appropriately and accurately determine whether the vehicle is traveling on a gradient or on a road on level ground without that determination being affected much or at all by any sudden changes in the slope.

In particular, with the method for determining whether the vehicle is traveling on a gradient or on level ground according to this example embodiment, the determination as to whether the vehicle is traveling on level ground may be made based on i) the distance the vehicle has traveled, which is measured in units of the predetermined distance L, ii) an end slope measured at the beginning of the predetermined distance L (i.e., one representative value determined in units of one predetermined distance L), for example, and iii) the end slope of the predetermined distance L of the last leg (i.e., another representative value determined in units of another predetermined distance L), for example, as shown in the lower portion of FIG. 3.

More specifically, as shown in the lower portion of FIG. 3, the slope at the beginning point P1 of the 1st predetermined distance is first tentatively determined as the representative value. Next, this tentatively determined representative value is compared with the slope measured in the predetermined distance L, and the slope with the smaller absolute value is used. That is, from the beginning point P1 to point P2 in the 1st predetermined distance L, the slope at the beginning point P1 is determinately used. On the other hand, from the point P2 to point P3, the actually measured slope in the predetermined distance L is determinately used.

In a similar manner, the slope at the beginning point P3 of the 2nd predetermined distance is tentatively determined as the representative value. This tentatively determined representative value is then compared with the actually measured slope that was measured in the predetermined distance L, and the slope with the smaller absolute value is determinately used. That is, from the beginning point P3 to point P4, 0 which is the slope at the beginning point P3 is determinately used.

In substantially the same manner, the slope at the beginning point P4 of the 3rd predetermined distance is tentatively determined as the representative value. This tentatively determined representative value is then compared with the actually measured slope that was measured in the predetermined distance L, and the slope with the smaller absolute value is determinately used. That is, from the beginning point P4 to point P5 in the 3rd predetermined distance L, the actually measured slope is determinately used. On the other hand, from point P5 to P6, 0 which is the slope at point P5 is determinately used.

In substantially the same manner, the slope at the beginning point P6 of the 4th predetermined distance is tentatively determined as the representative value. This tentatively determined representative value is then compared with the actually measured slope that was measured in the predetermined distance L, and the slope with the smaller absolute value is determinately used. That is, from the beginning point P6 to point P7, 0 which is the slope at the beginning point P6 is determinately used.

In substantially the same manner, the slope at the beginning point P7 of the 5th predetermined distance is tentatively determined as the representative value. This tentatively determined representative value is then compared with the actually measured slope that was measured in the predetermined distance L, and the slope with the smaller absolute value is determinately used. That is, from the beginning point P9 to point P8 in the 5th predetermined distance L, the actually measured slope is determinately used. On the other hand, from point P8 to P9, 0 which is the slope at point P8 is determinately used.

In substantially the same manner, the slope at the beginning point P9 of the 6th predetermined distance is tentatively determined as the representative value. This tentatively determined representative value is then compared with the actually measured slope that was measured in the predetermined distance L, and the slope with the smaller absolute value is determinately used. That is, from the beginning point P9 to point P10 in the 6th predetermined distance L, the slope at the beginning point P9 is determinately used. On the other hand, from point P10 to P11, the actually measured slope in the predetermined distance L is determinately used.

In substantially the same manner, the slope at the beginning point P11 of the 7th predetermined distance is tentatively determined as the representative value. This tentatively determined representative value is then compared with the actually measured slope that was measured in the predetermined distance L, and the slope with the smaller absolute value is determinately used. That is, from the beginning point P11 to point P12 in the 7th predetermined distance L, the actually measured slope is determinately used. On the other hand, from point P12 to right before P13, 0 which is the slope at point P12 is determinately used. In this way, the slope converges on zero even if the positive and negative are reversed in the predetermined distance L so the affect from a sudden change in the slope can be more appropriately absorbed.

In substantially the same, manner, the slope at the beginning point P13 of the 8th predetermined distance is tentatively determined as the representative value. This tentatively determined representative value is then compared with the actually measured slope that was measured in the predetermined distance L, and the slope with the smaller absolute value is determinately used. That is, from the beginning point P13 to point P14 in the 8th predetermined distance L, the slope at the beginning point P13 is determinately used. On the other hand, from point P14 to P15, the actually measured slope in the predetermined distance L is determinately used. Moreover, from point P15 to point P16, 0 which is the slope at point P15 is determinately used.

In substantially the same manner, the slope at the beginning point P16 of the 9th predetermined distance is tentatively determined as the representative value. This tentatively determined representative value is then compared with the actually measured slope that was measured in the predetermined distance L, and the slope with the smaller absolute value is determinately used. That is, from the beginning point P16 to right before point P17 in the 9th predetermined distance L, which is the slope at the beginning point P16 is determinately used.

In substantially the same manner, the slope at the beginning point P17 of the 10th predetermined distance is tentatively determined as the representative value. This tentatively determined representative value is then compared with the actually measured slope that was measured in the predetermined distance L, and the slope with the smaller absolute value is determinately used. That is, from the beginning point P17 to point P18 in the 10th predetermined distance L, the actually measured slope is determinately used. On the other hand, from point P18 to right before point P19, 0 which is the slope at point P18 is determinately used.

In particular, with the method for determining whether the vehicle is traveling on a gradient or on level ground according to this example embodiment, the determination as to whether the vehicle is traveling on level ground may be made based on i) the distance the vehicle has traveled, which is measured in units of a predetermined distance L, ii) an end slope measured at the beginning of the predetermined distance L (i.e., one representative value determined in units of one predetermined distance L), for example, and iii) the end slope of the predetermined distance L of the last leg (i.e., another representative value determined in units of another predetermined distance L), for example, as shown in the lower portion of FIG. 3. Incidentally, the end slope measured at the beginning of the predetermined distance L corresponds to the variable Cal which will be described later. Also, the end slope determined (used) at the predetermined distance L of the last leg corresponds to the variable SlopeCal which will also be described later.

More specifically, the value of the slope determined in the 6th predetermined distance of the last leg, for example, may be used instead of the value of the slope used right up until the determined points P11, P12, and P13, as described above, in the 7th predetermined distance described above, for example, as shown by the variable SlopeCal, which will be descried later, in the lower portion of the graph in FIG. 3.

Accordingly, it is possible to more appropriately and accurately determine whether the vehicle is traveling on a gradient or on a rough road that is regarded as being on level ground based on the correlative transition between the distance traveled which does not rely on time and the representative value determined in units of the predetermined distance L.

(2-2) Routine for Determining Whether Vehicle is Traveling on a Gradient or on Level Ground:

Next, a specific example of a routine used to determine whether the vehicle is traveling on a gradient or on level ground according to this example embodiment will be described with reference to the flowchart in FIGS. 4A, 4B. This determining routine is repeatedly executed by the ECU 10 in predetermined cycles of, for example, several tens of μ seconds or several μ seconds.

Figure 4A:
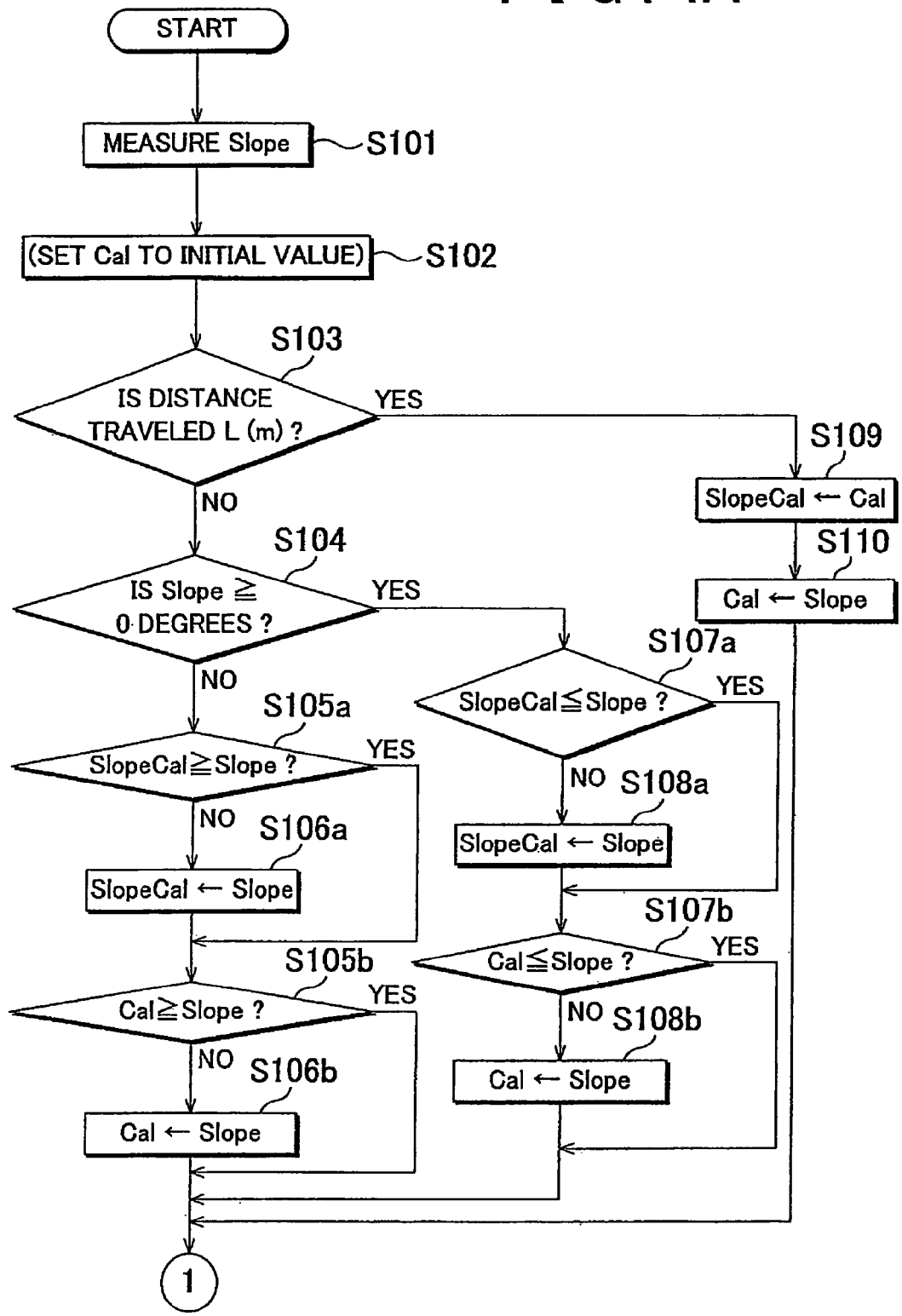
FIGS. 4A, 4B is a flowchart illustrating one specific example of a routine for determining whether the vehicle is traveling on a gradient or on level ground according to the example embodiment.
Figure 4B:
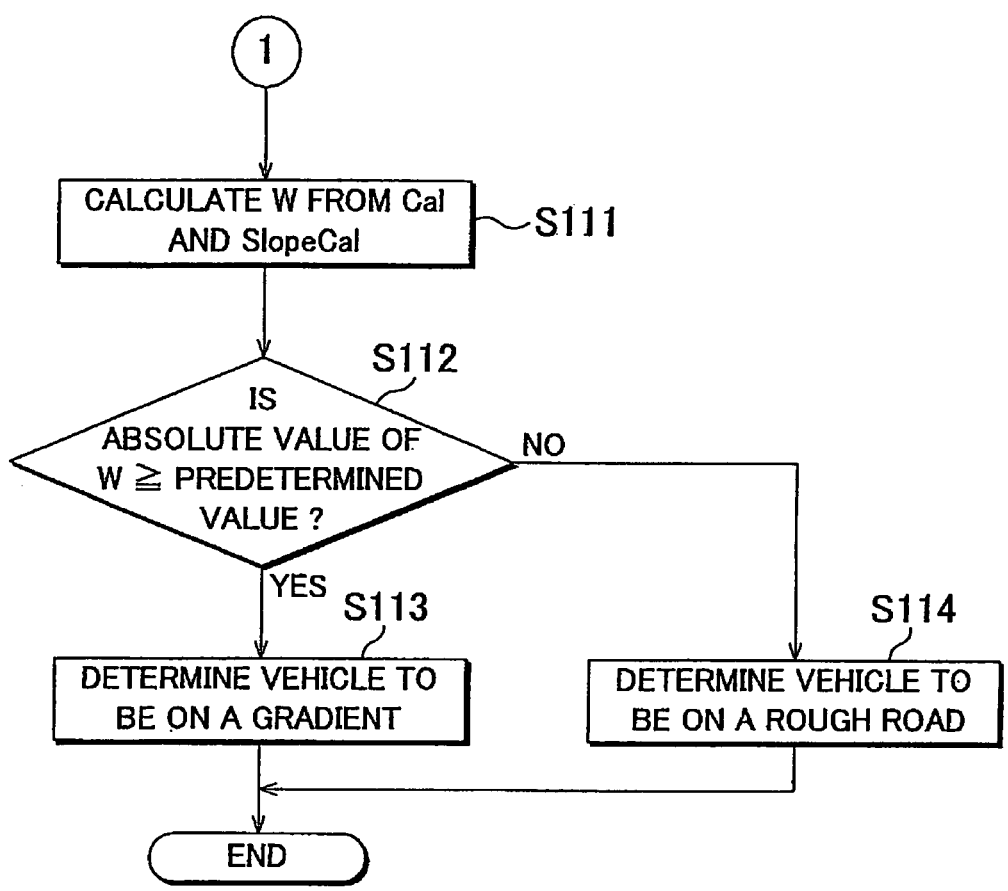

As shown in FIGS. 4A, 4B, first the slope of the road on which the vehicle is traveling is measured by the acceleration sensor under the control of the ECU 10 (step S101).

Next, the ECU 10 sets the variable Cal of the end slope, for example, to an initial value (step S102) at a predetermined timing such as at engine startup or when the vehicle starts to run off-road, for example.

Next, the ECU 10 determines whether the vehicle has traveled a predetermined distance L farther than the end of a predetermined distance L (m: meter) learned in the last cycle of the routine, for example, based on the distance the vehicle has traveled which is measured by a distance sensor (step S103). If the vehicle has not traveled the predetermined distance L (i.e., No in step S103), the ECU 10 then determines whether the slope measured by the acceleration sensor is equal to or greater than 0 degrees (step S104). If the slope is not equal to or greater than 0 degrees, i.e., if the slope is less than 0 degrees such that the vehicle is descending, (i.e., No in step S104), the ECU 10 then determines whether the variable SlopeCal which is for example the average value of the slope of the predetermined distance L of the last leg is equal to or greater than a slope Slope (step S105a). If the variable SlopeCal which is for example the average value of the slope of the predetermined distance L of the last leg is not equal to or greater than the slope Slope, i.e., if the variable SlopeCal is less than the slope Slope (i.e., No in step S105a), then the slope Slope is substituted for the variable SlopeCal (step S106a). Then the ECU 10 determines whether a variable Cal of the end slope, for example, is equal to or greater than the slope Slope (step S105b). If the variable Cal of the end slope, for example, is not equal to or greater than the slope Slope (i.e., No in step S105b), i.e., if the variable Cal is less than the slope Slope, the slope Slope is substituted for the variable Cal (step S106b).

As a result, when the vehicle descending off of a bump on level ground, for example, a determination as to whether the vehicle is traveling on a gradient or on a rough road can be made based on the slope having the smaller absolute value from among the end slope or the slope of the calculated value, and the actually measured slope, for example.

On the other hand, if the slope Slope is equal to or greater than 0 degrees in step S104, i.e., if the slope Slope is greater than 0 degrees such that the vehicle is climbing up a bump or climbing up a gradient, for example (i.e., Yes in step S104), the ECU 10 then determines whether the variable SlopeCal which is, for example, the average value of the slope of the predetermined distance L of the last leg, for example, is less than or equal to the slope Slope (step S107a). If the variable SlopeCal which is, for example, the average value of the slope of the predetermined distance L of the last leg, for example, is not less than or equal to the slope Slope (i.e., No in step S107a), i.e., if the variable SlopeCal is greater than the slope Slope, then the slope Slope is substituted for the variable SlopeCal (step S108a). The ECU 10 then determines whether the variable Cal of the end slope, for example, is less than or equal to the slope Slope (step S107b). If the variable Cal of the end slope, for example, is not less than or equal to the slope Slope (i.e., No in step S107b), i.e., if the variable Cal is greater than the slope Slope, then the slope Slope is substituted for the variable Cal (step S108b).

As a result, when the vehicle is climbing up a bump on level ground or climbing up a gradient, for example, a determination as to whether the vehicle is traveling on a gradient or on a rough road can be made based on the slope having the smaller absolute value from among the end slope or the slope of the calculated value, and the actually measured slope, for example.

On the other, if it has been determined in step S103 that the vehicle has traveled the predetermined distance L (i.e., Yes in step S103), then the ECU 10 substitutes the variable Cal for the variable SlopeCal (step S109). Next, the ECU 10 substitutes the slope Slope in for the variable Cal (step S110). Therefore, the value of the end slope at the predetermined distance L of the last leg described above can be maintained by the variable SlopeCal.

Next, the ECU 10 calculates a calculated value W indicative of a quantitative or qualitative relationship between the distance traveled and the slope measured in the predetermined distance based on the variable Cal and the variable SlopeCal (step S111). More specifically, this calculated value W maintains the property in which the affect from sudden change in the slope is minimized, and may be theoretically, experimentally, or empirically, calculated or calculated based on simulation or the like. An example of this calculated value W is a value specified by i) an integral value in which the distance and slope of a predetermined distance of the last leg are used as parameters, and ii) an integral value in which the distance and the slope measured at a predetermined distance while the vehicle is currently running, which is the area indicated by vertical hatching, described above, shown in the lower portions of FIGS. 2 and 3.

Next, the ECU 10 determines whether the absolute value of the calculated value W is equal to or greater than a predetermined value (step S112). Here, this predetermined value is theoretically, experimentally, or empirically, specified or specified based on simulation or the like in order to be able to distinguish between a gradient and a rough road.

If it is determined in step S112 that the calculated value W is equal to or greater than the predetermined value (i.e., Yes in step S112), then the ECU 10 can determine that the vehicle is traveling on a gradient (step S113). On the other hand, if the calculated value W is not equal to or greater than the predetermined value, i.e., if the calculated value W is less than the predetermined value (i.e., No in step S112), the ECU 10 can determine that the vehicle is traveling on a rough road (step S114).

As a result, with the determining method according to this example embodiment, (i-1) one representative value determined in units of one predetermined distance L which is the end slope measured at the beginning of the predetermined distance L, for example, corresponds to the distance traveled. In addition, (i-2) another representative value determined in units of another predetermined distance L of, for example, a value of a slope measured at a predetermined distance L of the last leg corresponds to the distance traveled. Then, ii) the determination as to whether the vehicle is traveling on a gradient or on a rough road that is regarded as being on level ground may be made based on the change in one or the other of these representative values. Accordingly, it is possible to more appropriately and accurately determine whether the vehicle is traveling on a gradient or on a rough road that is regarded as being on level ground based on a correlative shift between the distance traveled that does not rely on time and the representative value determined in units of the predetermined distance L. In addition, when the vehicle is traveling at slow or extremely slow speeds, for example, it is possible to more appropriately and accurately determine whether the vehicle is traveling on a gradient or on a rough road that is regarded as being on level ground without that determination being affected much or at all by a sudden change in slope, based on a correlative shift between the distance traveled and the representative value.

Figure 5:
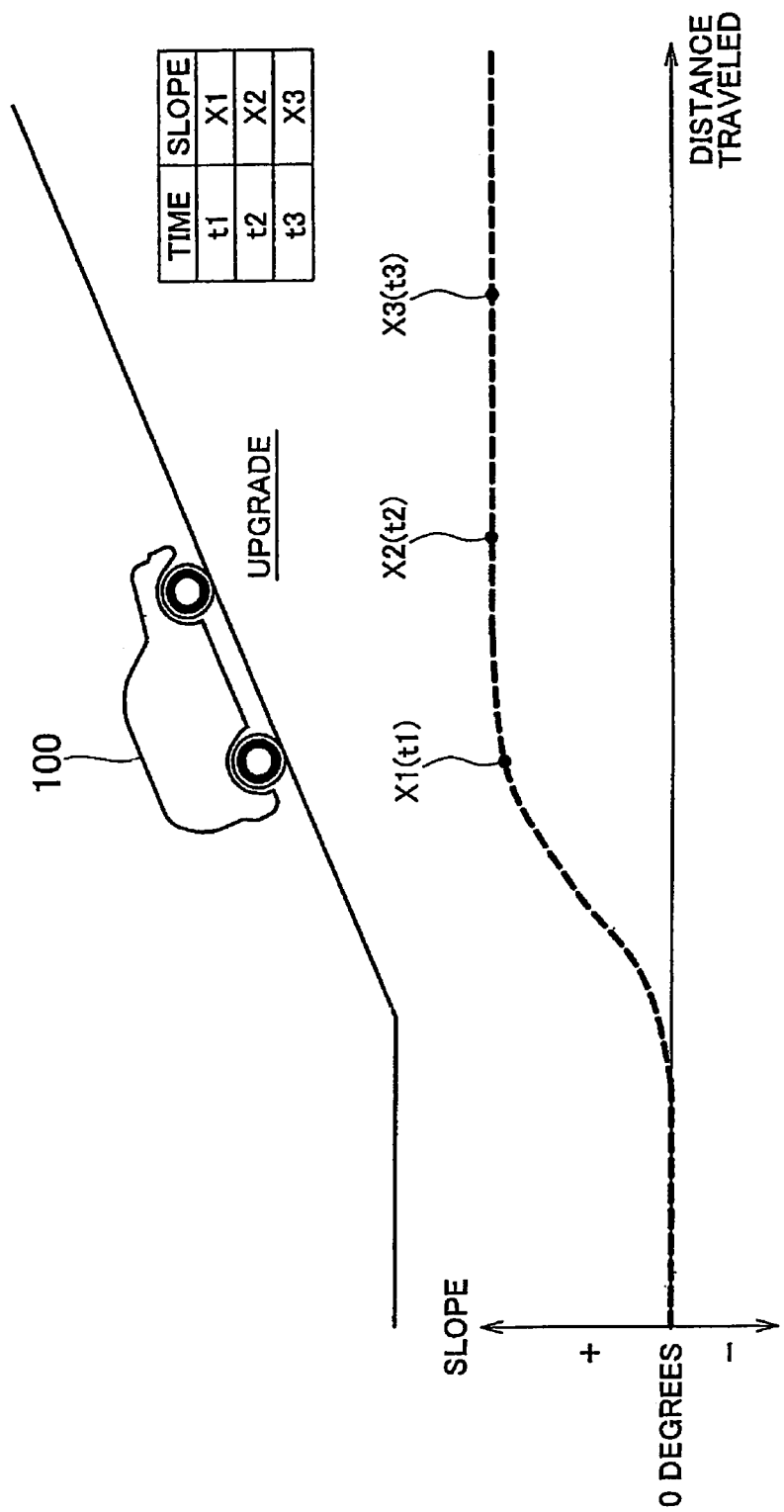
FIG. 5 is a view of a frame format schematically illustrating a determining method when a vehicle is traveling on a road on a gradient according to related art.
Figure 6:
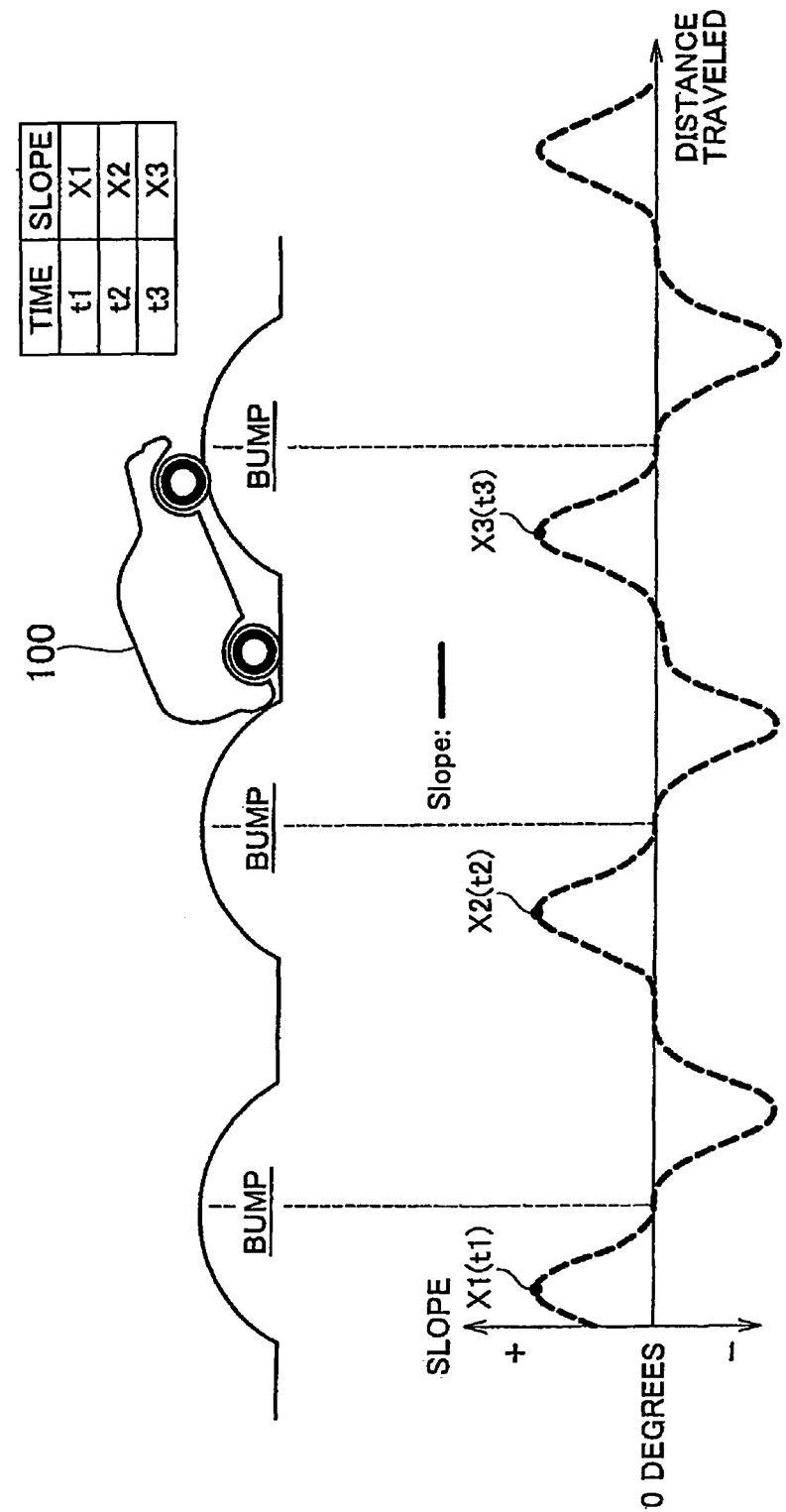
FIG. 6 is a view of a frame format schematically illustrating a determining method when a vehicle is traveling on a rough road that is regarded as being on level ground according to related art.

(2-3) Examination of the Operation and Effects of this Example Embodiment:

Next, the operation and effects of the method for determining whether the vehicle is traveling on a gradient or on level ground according to the example embodiment will be examined with reference to FIGS. 2 and 3 described above, in addition to FIGS. 5 and 6. FIG. 5 is a frame format schematically illustrating a determining method when a vehicle is traveling on a gradient according to related art, and FIG. 6 is a view of a frame format schematically illustrating a determining method when a vehicle is traveling on a rough road that is regarded as being on level ground according to related art. Elements in FIGS. 5 and 6 that are substantially the same as those shown in FIGS. 2 and 3 described above are denoted by the same reference numerals and descriptions thereof will be appropriately omitted.

As shown in FIGS. 5 and 6, in a determining method according to related art, the determination as to whether the vehicle is traveling on a gradient or on level ground is made based on the slope that is measured in units of time. Therefore, when the vehicle is traveling at slow or extremely slow speeds, it becomes technically difficult to distinguish between the gradient shown in FIG. 5 and the rough road shown in FIG. 6. More specifically, the slope X1 at time t1, the slope X2 at time t2, and the slope X3 at time t3 that were measured when the vehicle travels on the rough road shown in FIG. 6 switches with substantially the same positive value. Also, the slope X1 at time t1, the slope X2 at time t2, and the slope X3 at time t3 that were measured when the vehicle travels on the gradient shown in FIG. 5 switches with substantially the same positive value. Therefore, based on the correlative transition between the time and slope according to the related art, it is technically difficult to distinguish between a temporal transition in the slope measured when the vehicle is traveling on the rough road shown in FIG. 6 and a temporal transition in the slope measured when the vehicle is traveling on the gradient shown in FIG. 5. That is, the table of the time and slope in FIG. 5 that corresponds to the gradient and the table of the time and slope in FIG. 6 that corresponds to the rough road are substantially equivalent so it is technically difficult to distinguish between the gradient shown in FIG. 5 and the rough road shown in FIG. 6.

On the other hand, with the determining method according to this example embodiment, the determination as to whether the vehicle is traveling on a gradient or on level ground is made based on i) the distance traveled by the vehicle, which is measured in units of a predetermined distance L, and ii) the slope measured in units of the predetermined distance L. Therefore, it is possible to appropriately and accurately determine whether the vehicle is traveling on a gradient or on a rough road on level ground based on the correlative transition between the distance traveled that does not rely on time, and the slope.

In addition, with the determining method according to this example embodiment, iii) a representative value corresponds to the distance traveled. This representative value is determined in units of the predetermined distance L and is, for example, an end slope measured at the beginning of the predetermined distance L, for example, or a calculated value including at least one of a minimum value, a maximum value, an average value, an integral value, and a derivative value of a slope measured in the predetermined distance L on which the vehicle is currently traveling, for example. Then, iv) the representative value determined in units of this predetermined distance L is compared with the actually measured slope measured in the predetermined distance L, and the determination as to whether the vehicle is traveling on a gradient or on a rough road regarded as being on level ground is made based on the slope having the smaller absolute value. Accordingly, it is possible to appropriately and accurately determine whether the vehicle is traveling on a gradient or on a rough road without that determination being affected much or at all by any sudden changes in the slope when the vehicle is traveling at slow or extremely slow speeds, for example.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A road slope determining apparatus for a vehicle, comprising:
   a slope measuring device that measures a slope of a road on which the vehicle is traveling;
   a distance measuring device that measures a distance traveled by the vehicle; and
   a determining apparatus that:
      determines, based on the measured slope and the measured distance traveled, whether the road on which the vehicle is traveling has a gradient and the slope in a direction of vehicle travel is continuous, the slope being continuous when a value of the slope either tends to increase and then become substantially constant over a first distance of travel substantially equal to a plurality of wheel bases, or tends to decrease and then become substantially constant over the first distance of travel;
      determines, based on the measured slope and the measured distance traveled, whether the road on which the vehicle is traveling is rough and the slope in the direction of vehicle travel is discontinuous, the slope being discontinuous when the road has substantially no slope, or the road has a slope that changes from positive to negative or negative to positive over a second distance of travel substantially equal to one wheel base; and when it is determined that the road on which the vehicle is traveling is rough and the slope in the direction of vehicle travel is discontinuous, the determining apparatus assumes that the road has substantially no slope.

2. The road slope determining apparatus for a vehicle according to claim 1, wherein the determining apparatus makes the determination based on a representative value of the slope determined over the second distance of travel.

3. The road slope determining apparatus for a vehicle according to claim 2, wherein the representative value is one of i) a calculated value that includes at least one from among an average value, a maximum value, a minimum value, an integral value, and a derivative value of the slope measured over the second distance of travel, and ii) an end slope which is the slope measured at one of a beginning point and an end point of the second distance of travel.

4. The road slope determining apparatus for a vehicle according to claim 2, wherein the determining apparatus makes the determination based on a comparison between i) the slope measured over the second distance of travel and ii) the representative value.

5. The road slope determining apparatus for a vehicle according to claim 4, wherein when the slope is positive, the determining apparatus makes the determination based on the smaller value from among (i-1) the slope measured over the second distance of travel and (i-2) the representative value, and when the slope is negative, the determining apparatus makes the determination based on the larger value from among (ii-1) the slope measured over the second distance of travel and (ii-2) the representative value.

6. The road slope determining apparatus for a vehicle according to claim 4, wherein the determining apparatus makes the determination based on the smaller absolute value that is tentatively selected when comparing i) the slope measured over the second distance of travel and ii) the representative value.

7. The road slope determining apparatus for a vehicle according to claim 2, wherein the determining apparatus determines the representative value to be zero when the positive and negative of the tentative value of the representative value and the slope measured over the second distance of travel become reversed.

8. The road slope determining apparatus for a vehicle according to claim 1, wherein the determining apparatus determines, as the determination, one of i) whether the vehicle is traveling on one of a road on an upgrade having a continuous positive slope and a road on a downgrade having a continuous negative slope as the gradient, and ii) whether the vehicle is traveling on a rough road having one of a discontinuous positive slope and a discontinuous negative slope as the rough road.

9. The road slope determining apparatus for a vehicle according to claim 1, wherein the distance measuring device measures the distance traveled in units of a predetermined distance, and the determining apparatus makes the determination based on a one of a quantitative relationship between the slope measured in the predetermined distance and the distance traveled and a qualitative relationship between the slope measured in the predetermined distance and the distance traveled.

10. The road slope determining apparatus for a vehicle according to claim 1, wherein the determining apparatus makes the determination based on i) one slope measured over the second distance of travel and ii) another slope measured over another adjacent second distance of travel.

11. The road slope determining apparatus for a vehicle according to claim 1, wherein a minimum value of the second distance of travel is specified based on a distance between a first position where a front wheel of the vehicle contacts the road and a second position where a rear wheel of the vehicle contacts the road.

12. The road slope determining apparatus for a vehicle according to claim 1, wherein a maximum value of the second distance of travel is specified based on an overall length of the vehicle.

13. The road slope determining apparatus for a vehicle according to claim 1, wherein the distance measuring device measures the distance traveled based on a speed of the vehicle and the time traveled.

14. A road slope determining apparatus for a vehicle, comprising:
   a slope measuring device that measures a slope of a road on which the vehicle is traveling;
   a distance measuring device that measures a distance traveled by the vehicle in units of a predetermined distance; and
   a determining apparatus that:
      compares the slope measured over the predetermined distance with a representative value of the slope, and uses the one of the measured slope or the representative value having the smaller absolute value as a new representative value;
      calculates a value indicative of a quantitative or qualitative relationship between the distance traveled and the slope based on the new representative value and the predetermined distance; and
      determines, if the calculated value is equal to or greater than a predetermined value, that the vehicle is traveling on a road on a gradient and the slope in a direction of vehicle travel is continuous.

\* \* \* \* \*